April 19, 1960     F. BROUWER     2,933,668
ELECTRIC MOTOR CONTROL SYSTEM AND CURVE TRACER
Filed July 9, 1957     3 Sheets-Sheet 1
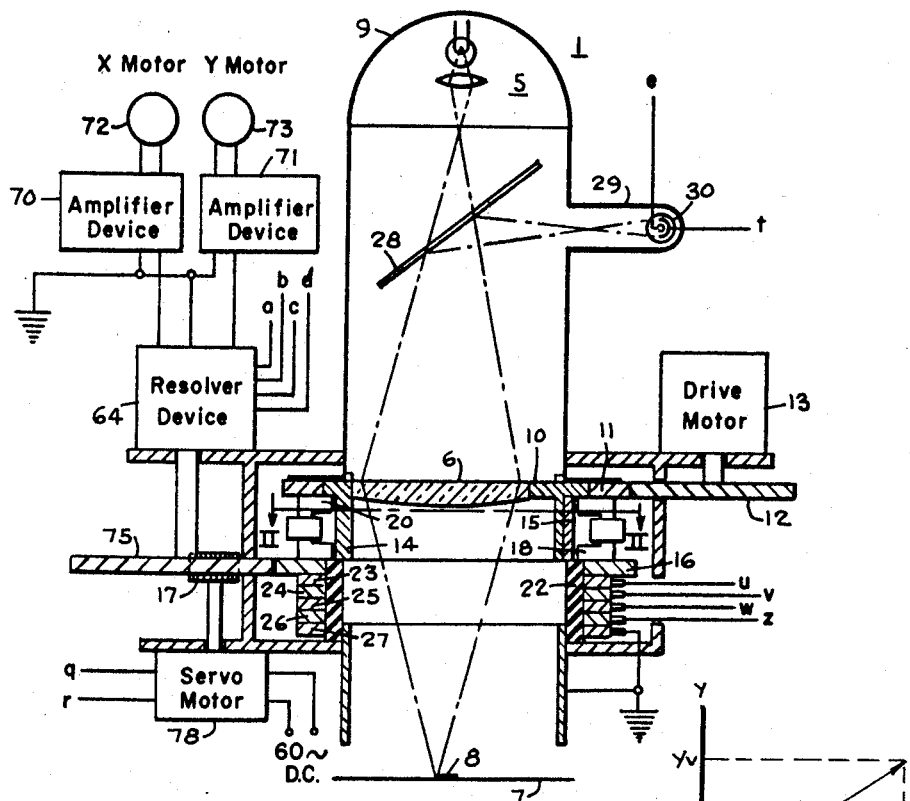
Fig.1.
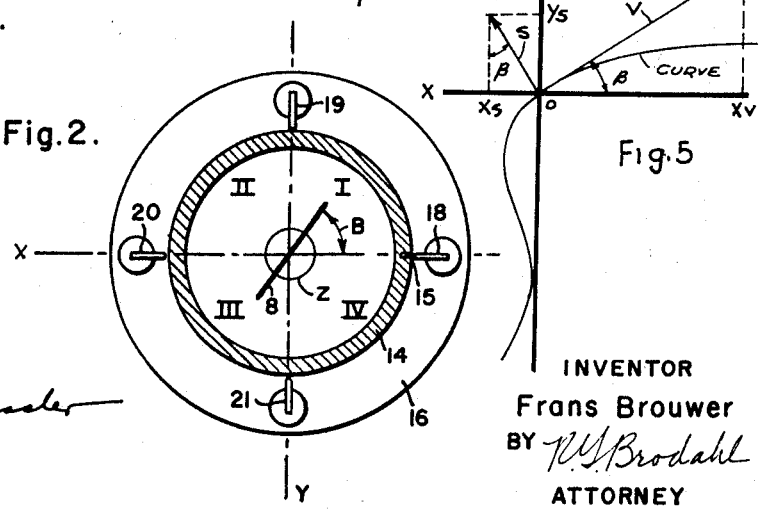
Fig.2.
Fig.5
WITNESSES
INVENTOR
Frans Brouwer
BY
ATTORNEY

United States Patent Office 2,933,668
Patented Apr. 19, 1960

2,933,668

ELECTRIC MOTOR CONTROL SYSTEM AND CURVE TRACER

Frans Brouwer, Ancaster, Ontario, Canada, assignor to Canadian Westinghouse Company, Ltd., Hamilton, Ontario, Canada Application July 9, 1957, Serial No. 670,808

Claims priority, application Canada July 14, 1956

6 Claims. (Cl. 318—162)

My invention relates in general to control systems, and in particular to control systems for automatic line tracers.

It is known in the prior art to provide automatic pattern following machines which are operative to trace the edge of a template by virtue of the difference in light transmission or reflection characteristics of a template and some surrounding material relative to the template. One of the main disadvantages of such systems in the past has been their inability to rapidly follow discontinuities or even rapidly changing template contours accurately. This has in part been due to the use of a mechanical drive relating the tracing head with the template pattern. It has been known for example to directly or pantographically couple a mechanical driving wheel, driven at constant speed, to the scanning head. Another source of inaccuracy has been the use of scanning heads which in some degree are not concentric with the effective center of the work member and which may in fact, even lead the work member in an effort to reduce the possibility of ambiguity.

It is an object of my invention to provide an improved guide line tracer mechanism which maintains a constant linear velocity relative to the guide line without the use of mechanical contact drives.

It is a further object of my invention to provide an improved optical line tracer mechanism in which the scanning head is optically concentric with the effective center of rotation of the work member.

These and other objects are attained by providing a line tracker mechanism which is not driven at constant velocity by virtue of a contact member but which utilizes a potential to generate control voltages of such value that they produce a constant velocity proportional to the supplied potential. A photo-electric scanning device circularly scans four quadrants and the respective outputs from the four quadrants are compared to produce error signals which are then utilized to control the position of the scanner. The error signals represent the displacement of the axis of the scanner from the center of the line being traced and the angular error of the direction of the tracing head relative to a tangent to the guide line at the point being scanned.

A clearer understanding of my invention may be had from the following description on one specific embodiment as shown in the drawings, in which:

Figure 1 is a sectional view of the scanning head;

Fig. 2 is a view taken on section line II—II of Fig. 1 of the lower portion of the scanner;

Fig. 5 is a graph used in explaining the operation of the apparatus according to this invention.

Figure 3:
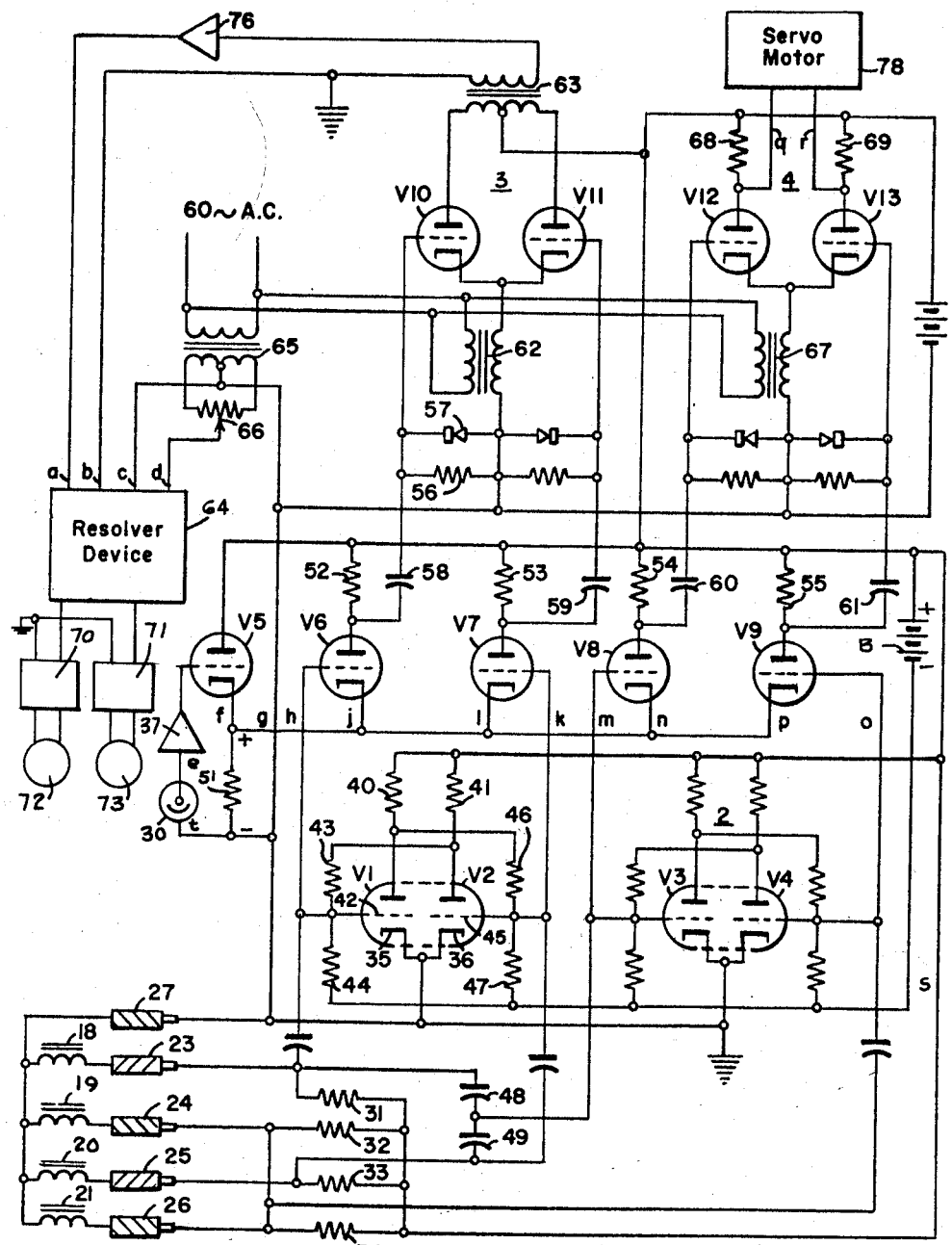
Fig. 3 is a schematic diagram of the control circuits required to switch and compare the signals desired by the scanner in the various quadrants of its operation, and of the pulse producing circuits required to produce the necessary switching signals.

In the drawings there is shown a line tracker mechanism including a scanning unit 1, a switching unit 2 and a servomotor control unit 3 operative to control the position of the scanning unit 1 and the controlled device. This control unit also includes the control devices 64, 70, 71, 72, 73 to be later described, and a servomotor control unit 4 operative to control the rotational position of the scanning unit 1.

In Fig. 1, there is shown a scanning unit consisting of a point light source 5 mounted in a casing 9. The light from this source is focused as a light beam on the surface of a pattern by a lens system 6. The pattern is shown as a black line 8 on a white background of paper or like material 7, the width of the line being exaggerated for purposes of illustration. The lens system 6 is eccentrically mounted in a sleeve 10 which is supported rotatably in the casing 9. Attached to the outer rim of sleeve 10 is a gear 11 which is in driving relation with a pinion 12 on the shaft of a motor 13.

On the lower surface of sleeve 10 is an extension member 14 of non-ferrous metal provided in its outer surface with a relatively narrow, vertically disposed magnetic insert member 15. Immediately below sleeve, or ring 10 is a further ring 16 having a gear at its outer edge which engages a pinion 17 on the shaft of a servomotor 78. The latter pinion 17 also engages a pinion 75 on the shaft of a resolver device 64. On the upper surface of the ring 16 are four inductance devices 18, 19, 20 and 21, each having a U-shaped ferro magnetic core and a conductive winding surrounding that core. As may be seen in Fig. 2, these inductance devices are arranged at 90° intervals around the ring 16 and have the open ends of their cores positioned in close proximity to the outer surface of the extension member 14. An elongated sleeve 22 of insulating material is, at its upper end, rigidly secured to ring 16 at the inner circumference of ring 16. The sleeve 22 is chosen of a length to constitute a downwardly directed extension of ring 16. Sleeve 22 is a support for the five slip-rings 23, 24, 25, 26 and 27. The ring 16, the inductance devices, the insulating sleeve 22 and the latter slip-rings together form a unitary structure that is rotatably mounted in the casing 9. Electrically conductive leads are connected to all the respective slip-rings through brushes which permit the continuous rotation of the unitary structure.

At the upper end of the casing 9 as shown in Fig. 1 is a semi-reflecting surface or unidirectionally reflective member 28 mounted at an angle of 45° with relation to the axis of the casing 9. At one side of the casing 9, and at the same level as the center of the semi-reflecting surface 28, and having its axis at right angles to the axis of casing 9 and in a plane passing through the axis of casing 9 which is perpendicular to the axis of the casing 9, is an extension 29 containing a photo sensitive element 30.

At this point of the description, it will be convenient to consider the operation of the scanner from a mechanical point of view. The light from source 5 is focused and operative with lens 6 to provide a beam of light on to the paper 7. The lens 6, however, is mounted eccentrically relative to the casing 9 and as a result the point of focus and the resulting beam of light is not aligned with the axis of the casing 9. The motor 13 is suitably energized to cause the pinion 12 to rotate the driving gear 11. The rotation of the gear 11 rotates the lens 6 causing the point of focus and the beam of light to describe a circular path over the surface of the paper 7. The light reflected from the paper passes back through the lens 6 and strikes the semi-reflective surface 28 and is reflected into extension 29 and onto the photocell 30. As the light beam rotates over the surface of the paper 7, the amount of light reflected back to the photocell 30 depends upon the condition of the paper surface. When the beam of light falls on the black line on the paper 7, this causes an abrupt decrease in the reflected light as sensed by the photocell 30. The output of the photocell 30 is thereby modulated and may then be utilized to determine the relationship of the point of focus of the light beam to the black line and therefore the relative position of the scanner device 1 to the line.

As the lens 6 rotates, the sleeve 14 similarly rotates and carries with it the magnetic insert 15 which passes in proximity to the inductance devices 18, 19, 20 and 21.

Figure 3 includes a schematic diagram of the electrical circuit of particularly the latter inductance devices. A positive potential from the conductor S is applied through resistors 31, 32, 33, 34, to the slip rings 23, 25, 24 and 26, and thence to the coils of inductance devices 18, 19, 20, and 21 respectively. The opposite ends of the latter coils are returned to a common ground point on the casing to slip-ring 27. As the magnetic insert 15 passes each of the inductance devices it passes in close proximity to the magnetic cores of these devices. This completes a magnetic path of reduced reluctance and causes an impulse to be generated. On the respective slip-rings therefore we have four electrical impulses thereby generated, one for each 90° of rotation of the lens 6. The first portion of the switching unit 2 comprises two pairs of electron tubes V1 and V2, V3 and V4. The tubes V1 and V2 are connected as a bistable multivibrator with their cathodes 35 and 36 being grounded and their anodes 38 and 39 being connected to a source of positive potential through the conductor S and through resistors 40 and 41 respectively. The grid 42 of the tube V1 is connected to the anode of tube V2 through resistor 43 and to the B— negative potential terminal of voltage source B through resistor 44. The grid 45 of the tube V2 is connected to the anode of tube V1 through resistor 46 and to the B— negative potential terminal through resistor 47. The mode of operation of such a circuit is well known and will not, therefore, be described, but it will be understood that normally one tube is fully conductive while the other is cut off or nonconductive. The impulses, from the slip-ring 23 are applied to the grid of tube V1 while those from the slip-ring 25 are applied to the grid of tube V2 through suitable coupling capacitors. The application of these impulses causes the tubes V1 and V2 to become alternately conductive.

Similarly the tubes V3 and V4 form a bistable multivibrator under the control of the impulses generated by the inductive devices. The grid of tube V3 is supplied with pulses from the slip-rings 23 and 25 while the grid of tube V4 is supplied with pulses from the slip-rings 24 and 26. In order to prevent the impulses on the slip-ring 23 from appearing on the slip-ring 25 and vice versa the grid of tube V3 is coupled to the slip-rings 23 and 25 through small capacitors 48 and 49.

In Fig. 3 the tube V5 is the cathode follower output stage of an amplifier 37, the input of which is connected to the photocell 30. The cathode of tube V5 is connected to ground through resistor 51, while the anode of this tube is connected to a source of positive potential. The tubes V6, V7, V8 and V9 are a series of switch tubes controlled by the multivibrators, and the grids of these tubes are coupled to the grids of the tubes V1 to V4 respectively. The cathodes of the tubes V6 to V9 are connected in common to the cathode of tube V5.

The anodes of the tubes V6 to V9 are connected through resistors 52 to 55 respectively to a source of positive potential. The output of tube V6 is connected to a detector circuit comprising resistor 56 and rectifier 57 through capacitor 58 which is connected to the grid of tube V10. Similarly the outputs of the tubes V7, V8 and V9 are coupled through capacitors 59, 60 and 61 to similar detector circuits and to the grids of the tubes V11, V12 and V13, respectively.

The cathodes of the tubes V10 and V11 are returned to ground through the secondary winding of transformer 62. The primary winding is supplied with 60 cycle alternating current from a suitable A.C. supply. The anodes of tubes V10 and V11 are connected to opposite ends of the primary winding of transformer 63, which is supplied with a constant potential at its center tap. The output from the secondary winding of transformer 63 is fed through an amplifier 76 to one stator coil of the resolver device 64 through the leads or conductors $a$ and $b$. A variable alternating potential is obtained from transformer 65, which is supplied from the above mentioned 60 cycle A.C. supply, by the potentiometer 66, and this potential is applied to the other stator coil of the resolver device 64 through the leads $c$, $d$.

The cathodes of tubes V12 and V13 are connected together and returned to ground through the secondary winding of transformer 67. The anodes of these tubes are supplied with a positive potential through resistors 68 and 69 respectively, and the output from tubes V12 and V13 appears across terminals $q$ and $r$ which are connected to terminals $q$ and $r$ of servomotor 78 shown in Figure 1 through an amplifier if required. The outputs from the two rotor coils of the resolver device 64 are applied to the amplifier devices 70 and 71, which control the drive motors 72 and 73 (Fig. 1). No details of the drive motors or their amplifiers are shown since they are well known but it will be understood that they are of sufficient size to drive the carriage carrying the scanning head and the controlled tool, or if desired a table supporting the template and work piece, and that they are completely reversible depending upon the polarity of the signals derived from the resolver device 64, as well known to persons skilled in this art.

With the scanner 1 in the position shown, the insert member 15 is passing opposite the inductance device 18. This causes a pulse to appear on the slip-ring 23 which is applied to the grid of tube V1. The circuit of the multivibrator tubes V1 and V2 is so arranged that this impulse causes tube V1 to become conducting. This applies a negative impulse to the grid of tube V2, which is rendered non-conducting and remains non-conducting only as long as tube V1 is conducting. The positive impulse from V2 also renders V6 conducting. As the ring 14 is rotated by the motor 13, the magnetic insert member 15 passes opposite the inductance device 20 and causes an impulse to appear on the slip-ring 25, which impulse is applied to the grid of tube V2. The multivibrator is arranged to be bistable and therefore until this pulse appears tube V2 has been non-conducting. The pulse causes tube V2 to become conducting and causes tube V1 to become non-conducting, and a positive impulse is applied to the grid of tube V7 which up to now has been non-conducting. During one half of the scanner rotation then tube V6 is conducting while tube V7 is conducting during the other half.

The circuit of the multivibrator tubes V3 and V4 is similar to the previously described circuit, except that the grid of tube V3 has applied to it the impulses from inductance devices 18 and 20 while the impulses from the devices 19 and 21 are applied to the grid of tubes V4. The tube V4 therefore is non-conducting for the first quarter rotation from the position shown, assuming the rotation to be counterclockwise, and the next impulse is from the inductance device 19 which causes tube V3 to become non-conducting. As previously explained with reference to tubes V6 and V7, the tubes V8 and V9 are alternately conducting. The tube V8 for example is conducting only when tube V3 is conducting. The next impulse is from the inductance device 20 which causes impulse to tube V4 to be conducting and the fourth impulse is from inductance 21 which causes tube V3 to be non-conducting.

Considering the complete rotation as shown in Figure 2 as consisting of a first quadrant I between the inductance devices 18 and 19, a second quadrant II between the devices 19 and 20, a third quadrant III between the devices 20 and 21, and a fourth quadrant IV between the devices 21 and 18 then tube V8 is conducting during quadrants I and III and tube V9 is conducting during quadrants II and IV.

It will be understood that the functions just described are substantially equivalent to a mechanical commutator. The switch unit and the pulse generator could be replaced by a mechanical commutator having four brushes connected to the grids of tubes V6 to V9 in such a way as to produce a similar switching action.

Alternatively the whole commutating action could be performed mechanically with the output signal from amplifier 37 being applied to tubes V10 to V13 through a mechanical commutator mounted on the ring 16. However, the problems of such mechanical commutation such as noise and brush wear are sufficient to indicate that the system shown is to be preferred.

A further alternative mode of operation would be to arrange the rotating mechanism, i.e., the lens assembly, to be driven by a synchronous motor having a constant phase relationship between the rotor and the rotating field, with the stator of the motor rotatable by a servomotor. The alternating current supplied to this synchronous motor may then be clipped and supplied, to a phase sensitive detector together with the output signal from the photocell. A double frequency supply may also be derived from this source and also applied to a phase sensitive detector, together with the output signal from the photocell. The outputs from the phase sensitive detectors will then be the required outputs which must be applied to the resolver device 64 as in the previous example while the output from the latter detector will be the signal which must be applied to the servomotor 78.

It will be assumed for convenience that there is no output signal from photocell 30 unless the spot or beam of light impinges on an unblackened surface. As the spot of light rotates in a path corresponding to the circle Z as shown in Fig. 2 during the first quadrant I there is very little output signal from the photocell 30 since the light beam impinges partly on the unblackened surface of the paper 7 and partly on the blackened line 8. In quadrant II there is a greater and maximum output signal from the photocell 30 since the light beam impinges wholly on the paper 7 and thus the photocell output is maximum. In the quadrant III the photocell output is very small for similar reasons as it was in quadrant I, while in quadrant IV the output of photocell 30 is once again maximum. The photocell output is however applied to tube V5 which is a cathode follower and variations on the grid of tube V5 appear as variations on the cathodes of the tubes V6, V7, V8 and V9.

As tube V8 is conducting during quadrants I and III, the signal applied to the grid of tube V12 consists of one signal proportioned to the lesser photocell output during the light beam movement through the quadrants I and III. Similarly the signal applied to the grid of tube V13 consists of the greater photocell output during the quadrants II and IV. The servomotor 78 is arranged and so connected to the outputs of the tubes V12 and V13 that it tends to rotate the ring 16 until the signal from tube V12 equals the signal from tube V13. Rotation of the ring 16 of course changes the position of the inductance devices relative to the paper 7, and the quadrants are thereby rotated until a line joining 18 and 20 is substantially parallel to a line tangent to line 8 at the center of rotation. Only at this point or position of the ring 16 does the signal from tube V12 equal the output signal from tube V13. And further, at the latter position of the ring 16 the output of the photocell 30 during quadrants I and II equals the output of the photocell 30 during quadrants II and IV.

As tube V6 is conducting during quadrants I and II the signal applied to the grid of tube V10 consists of the output of the photocell 30 during quadrants I and II. Similarly the signal applied to the grid of tube V11 consists of the output of the photocell 30 during quadrants III and IV. When these signals as supplied to the tubes V10 and V11 are substantially equal the output from the secondary winding of transformer 63 is substantially zero. When the signal applied to the grid of tube V10 is greater than the signal applied to tube V11 an output appears on the secondary winding of transformer 63 having an amplitude dependent upon the degree of unbalance. When the signal applied to the grid of V11 is greater, an output appears on the secondary winding of transformer 63 that is also proportional to the degree of unbalance but its phase is reversed compared to the previous output.

This output signal from secondary winding of transformer 63 is applied to the resolver device 64 together with an output signal from the speed control potentiometer 66 of fixed phase but having a variable amplitude.

If it is assumed that a line from 18 to 20 is parallel to a line tangent to line 8 at the center of rotation, then it will be seen that a comparison of the photocell output during quadrants I and II to the photocell output during quadrants III and IV will yield a figure dependent on the displacement of the axis of the scanning head from the center of line 8. The output from the secondary of transformer 63 therefore corresponds in amplitude to said displacement and corresponds in phase to the direction of said displacement relative to the center of line 8.

Referring to Fig. 5, assume the linear tracing speed along the line 8 (set by potentiometer 66) to equal a speed V and the displacement of the axis of the scanning head from the center of the line 8 to be equal to a quantity S and the angle B as shown in Figure 2 to be the angle of the tangent to line 8 at the center of rotation relative to the X axis, then the signals required to control the speed and direction of the Y and X drive motors respectively to cause the tracing head to move along the center of the line 8 at constant velocity are (1) $$V \sin B + S \cos B = Y_v + Y_s$$

(2) $$V \cos B - S \sin B = X_v - X_s$$

These signals operate to return the head to the desired position.

The value of angle B is proportional to the position of the shaft of servomotor 78 and hence the shaft position of the resolver device 64. The displacement quantity S is proportional to the input to the resolver device 64 from the amplifier 76 while the speed V is proportional to the speed setting on potentiometer 66. The output of the resolver device rotor coils is therefore proportional to the above expressions 1 and 2. These outputs are used to control the X direction drive motor 72 and the Y direction drive motor 73. The scanning head therefore follows the line at a constant velocity with its axis on the center of the line 8 and as previously explained with the ring 16 so rotated that a line joining the inductance devices 18 and 20 is tangent to line 8 at the center of rotation of the ring 16.

Figure 4:
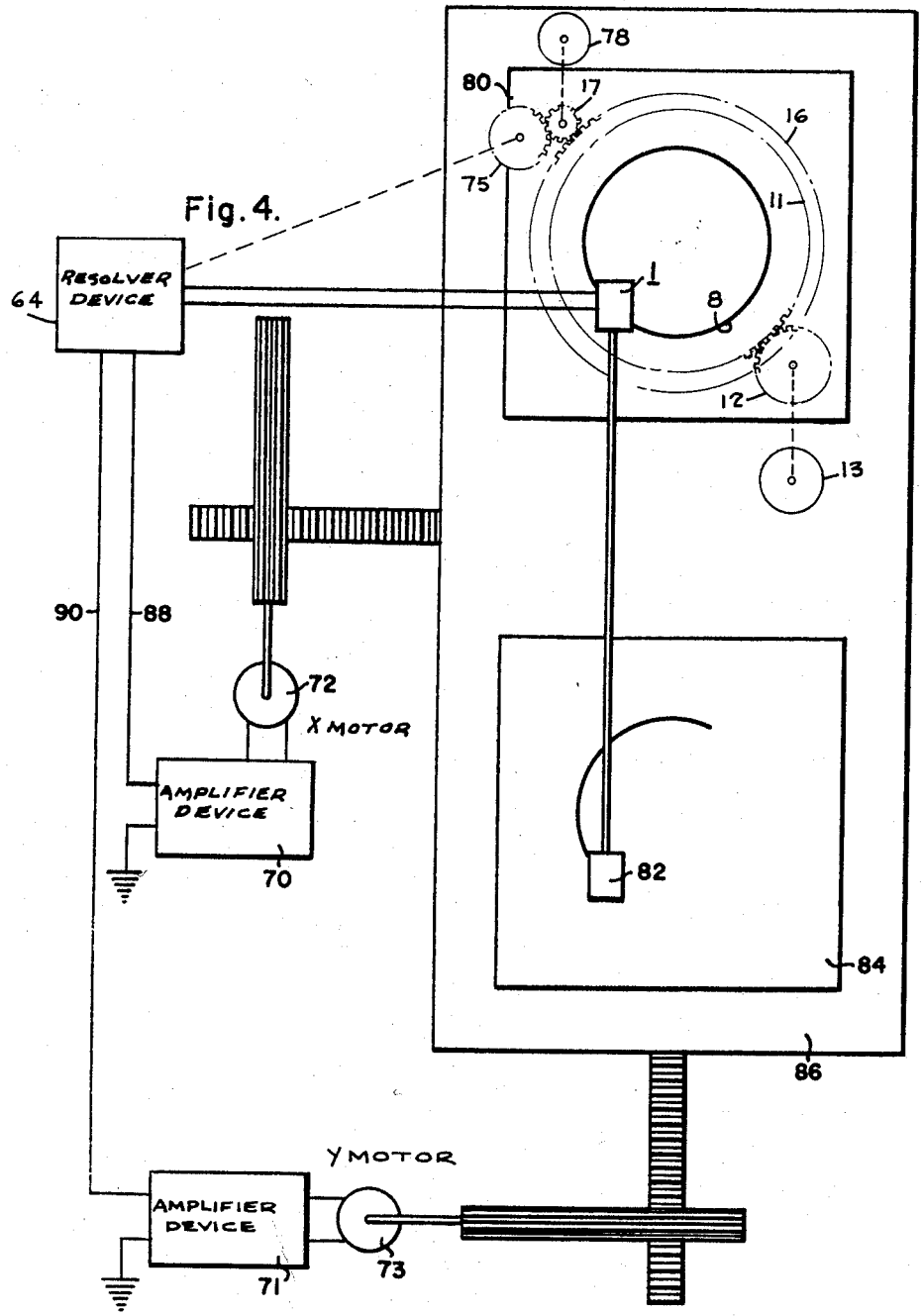
Fig. 4 is a view of suitable apparatus for use with the present control system.

In Fig. 4 there is shown a template or pattern member 80 including the guide line 8 and operative with the scanner unit 1. A cutting head or like device 82 is operative to perform a desired operation relative to a workpiece 84 as well known to persons skilled in this art. The latter workpiece 84 and the pattern member 80 are shown supported by a moveable base or table member 86 that is moveable in one direction by the motor 72 and moveable in a perpendicular direction by the motor 73. Suitable conductors 88 and 90 are provided between the scanning unit 1 and the respective amplifier devices 70 and 71.

While this apparatus has been described operating on a rectangular co-ordinate system the same operation would be possible in a polar co-ordinate system. However, in a polar co-ordinate system, the angular error is measured relative to the perpendicular from a radius.

I claim as my invention:

1. In an automatic guide line tracer apparatus of the type in which the tracing movement of a scanner device having an axis of rotation is controlled by first and second coordinate drive motors, the combination of first control means responsive to the position of said guide line for providing a first control signal proportional to the angular direction of the guide line with respect to a predetermined reference line, second control means for providing a second control signal proportional to the desired linear velocity of the scanner device relative to said guide line, and third control means responsive to the position of said guide line for providing a third control signal proportional to the displacement of said axis of the scanner device relative to the center of said guide line, and fourth control means responsive to each of said first, second and third control signals for providing a pair of output signals of such value as to drive the respective coordinate drive motors with such velocity and direction as to cause the scanner device to trace the guide line with substantially constant linear velocity.

2. In an automatic guide line tracer apparatus including a scanner device the tracing movement of which is controlled in a first direction by an X drive motor and in a second direction by a Y drive motor, the combination of first control means responsive to the position of said guide line for providing a first control signal B proportional to the angular direction of said guide line relative to a predetermined reference line, second control means responsive to the position of said guide line for providing a second control signal S proportional to the displacement of the axis of said scanner device relative to the center of said guide line, third control means for providing a third control signal V proportional to a predetermined desired linear velocity of the scanner device relative to said guide line, and fourth control means responsive to each of said first, second and third control signals for combining the latter said signals to provide a first output signal $V \sin B + S \cos B$ and a second output signal $V \cos B - S \sin B$, with said fourth control means being operative with said X and Y drive motors for controlling one of said motors with said first output signal and the other of said motors with said second output signal.

3. In an automatic guide line tracer apparatus including a scanner device the tracing movement of which relative to a surface including said guide line is controlled by first and second coordinate drive motors, the combination of a photoelectric device within the scanner device and capable of providing a first control signal dependent upon the relative reflective powers of the surface including said guide line being scanned, first control means operative with said scanner device to effectively move the area being scanned on said surface in a circular path of predetermined radius about an axis of the scanner device, second control means operative with said photoelectric device to derive from said first signal a second control signal proportional to the angular direction of the guide line relative to a predetermined reference line, third control means operative with said photoelectric device to derive from said first signal a third control signal proportional to the displacement of the center of said circular path from the center of said guide line, fourth control means operative wtih said scanner device to produce a fourth control signal proportional to a predetermined desired linear tracing velocity, and fifth control means responsive to said second, third and fourth control signal to produce a pair of output signals of such value as to drive the respective coordinate drive motors with such velocity and direction as to cause the scanner device to trace the guide line with substantially constant linear velocity.

4. In an automatic guide line tracer apparatus including a scanner device the tracing movement of which relative to a surface including said guide line is controlled by first and second coordinate drive motors, the combination of a photoelectric device operative with said scanner device for providing a signal proportional to the reflective qualities of the surface including said guide line being scanned by said scanner device, with said scanner device being operative to move the area of said surface being scanned in a circle of predetermined radius about an axis of the scanner, first control means operative with said scanner device to select from said signal only that portion produced during a first ninety degrees of rotation of said scanner device relative to a predetermined reference line, second control means operative with said scanner device to select from said signal only that portion produced during the second ninety degrees of rotation relative to said reference line, third and fourth control means operative with said scanner device to select respectively those portions of said signal produced during the third and fourth ninety degrees of rotation relative to said reference line, first circuit means operative with said first and third control means to combine and integrate the signals produced during the first and third ninety degrees of rotation, second circuit means operative with said second and fourth control means to combine and integrate the signals produced during the second and fourth ninety degrees of rotation, a first control device operative with said first and second circuit means to utilize the resultant integrated values to maintain said predetermined reference line substantially parallel to the guide line at the point being scanned, third circuit means operative to derive a control signal B proportional to the angular position of said predetermined reference line relative to said guide line, fourth circuit means operative to produce a control signal V proportional to a predetermined desired linear velocity of said scanner device relative to said guide line, a second control device operative to combine and integrate the signals produced during the first and second ninety degrees of rotation, a third control device operative to combine and integrate the signals produced during the third and fourth ninety degrees of rotation, and a fourth control device operative to subtract the last two integrated values to produce a signal S proportional to the displacement of the axis of the scanner device relative to the center of said guide line, and a resolver device operative to combine said signals B, V and S to provide a first output signal $V \sin B + S \cos B$ and a second output signal $V \cos B - S \sin B$, and control means operative to apply the respective first and second output signals to the first and second coordinate drive motors for controlling the movement of said scanner device relative to said guide line.

5. The method of causing a tool to follow a curve comprising scanning said curve by causing sensing means to move through an angle of at least 360° around successive elemental portions of said curve in sensing relationship with each of said portions, comparing the response of said sensing means for each said portion in one set of opposite quadrants of said angle with the response of said sensing means for said last-named portion in the other set of opposite quadrants of said angle to derive a first error quantity, comparing the response of said sensing means for each said portion in one set of adjacent quadrants of said angle with the response of said sensing means for said last-named portion by the other set of adjacent quadrants of said angle to derive a second error quantity, correcting the angle at which said scanning progresses correspondingly to said first error, and correcting the latter displacement of said scanning with respect to said curve corresponding to said second error.

6. Tracer apparatus for causing a tool to follow a curve comprising curve sensing means, means connected to said sensing means for actuating said sensing means to scan said curve by moving progressively through an angle of at least 360° around successive elemental portions of said curve in sensing relationship with each of said portions, means connected to said sensing means responsive to the difference between the response of said sensing means in the first and the third quadrants of said angle for each said portion and the response of said sensing means in the second and the fourth quadrants of said angle for said last-named portion for setting the angle at which said scanning progresses to reduce said difference, and means responsive to the difference between the response of said sensing means in the first and the second quadrants of said angle of at least 360° for each said portion and the response of said sensing means in the third and the fourth quadrants of said last-named angle for displacing said scanning laterally so as to reduce said last-named difference.

References Cited in the file of this patent
UNITED STATES PATENTS

| | | |
|---|---|---|
| 1,923,208 | Howey | Aug. 22, 1933 |
| 2,121,211 | Padva | June 21, 1938 |
| 2,489,305 | McLennan | Nov. 29, 1949 |
| 2,499,178 | Berry et al. | Feb. 28, 1950 |
| 2,521,946 | Rathje | Sept. 12, 1950 |